United States Patent [19]

Poppe et al.

[11] Patent Number: 4,729,897
[45] Date of Patent: Mar. 8, 1988

[54] GELATIN PRODUCT HAVING HIGHLY IMPROVED PROPERTIES OF WETTABILITY AND DISPERSIBILITY, AND A METHOD OF MAKING THE SAME

[75] Inventors: Jan Poppe, Lovendegem, Belgium; Claude Ridoux, Isle-sur-Sorgue, France; Bernard Grouber, Boissy-St. Leger, France; Michel Schoentjes, Versailles, France

[73] Assignee: Compagnie Rousselot, S.A., Paris, France

[21] Appl. No.: 893,167

[22] Filed: Aug. 1, 1986

[30] Foreign Application Priority Data

Aug. 7, 1985 [FR] France .................. 85 12090

[51] Int. Cl.$^4$ ............................. A23L 1/04
[52] U.S. Cl. ........................ 426/96; 426/576; 426/302
[58] Field of Search .............. 426/96, 577, 98, 302, 426/576

[56] References Cited

U.S. PATENT DOCUMENTS

| Re. 27,583 | 2/1973 | Vadrot | 426/576 |
|---|---|---|---|
| 3,024,167 | 3/1962 | Damaskus | 426/576 |
| 3,632,350 | 1/1972 | Battista | 426/576 |
| 3,763,138 | 10/1973 | Rakoczy et al. | 426/576 |
| 3,930,052 | 12/1975 | DeBrou et al. | 426/576 |
| 4,528,204 | 7/1985 | Shank | 426/576 |
| 4,615,896 | 10/1986 | Brown et al. | 426/576 |
| 4,615,897 | 10/1986 | Brown et al. | 426/576 |

FOREIGN PATENT DOCUMENTS

| 799534 | 4/1936 | France . |
|---|---|---|
| 808367 | 11/1936 | France . |
| 2167197 | 8/1973 | France . |

Primary Examiner—Jeanette Hunter
Attorney, Agent, or Firm—Gottlieb, Rackman & Reisman

[57] ABSTRACT

A gelatin product which offers highly improved properties of wettability and dispersibility in aqueous liquids irrespective of temperature and which permits accelerated dissolution in the hot state irrespective of the concentration is constituted by 90 to 99.9% by weight of a basic gelatin of any desired origin having a Bloom strength within the range of 0 to 350 grams and a viscosity within the range of 1 to 100 mPa.s. The gelatin product is also constituted by 0.1% to 10% by weight of a hydrolyzed gelatin of any desired origin having a mean molecular weight of 500 to 30,000. The method of preparation includes coating the particles of a basic gelatin with a film of hydrolyzed gelatin. The resulting product is well suited for all the usual applications of gelatin.

17 Claims, No Drawings

GELATIN PRODUCT HAVING HIGHLY IMPROVED PROPERTIES OF WETTABILITY AND DISPERSIBILITY, AND A METHOD OF MAKING THE SAME

BACKGROUND OF THE INVENTION

1. Field of the Invention

The present invention relates to a gelatin product having improved properties of wettability and dispersibility in aqueous liquids irrespective of the temperature and having substantially higher hot-state dissolving speeds irrespective of the concentration as a result of a surface treatment which consists of film formation on gelatin particles by means of a hydrolyzed gelatin.

It is known that practically all applications of gelatins require preliminary dissolution of these latter in an aqueous liquid. This explains the importance attached to its properties of wettability, dispersibility and solubility.

2. Description of the Prior Art

In the present state of the art, three modes of operation are in common use:
(a) swelling of the gelatin grains in the cold liquid followed by melting of the swollen grains in the hot state;
(b) direct dissolution of the gelatin in hot liquids;
(c) swelling of the gelatin grains in a minimum quantity of cold water followed by melting of these swollen grains in a hot liquid.

These three techniques present problems of wettability and dispersibility both in the cold state and in the hot state, the more so as the particle size of the gelatin is smaller.

Moreover, and for this reason, the method of direct dissolution usually makes it necessary in the case of the usual concentrations to adopt an initial step of dispersion of the product by very rapid agitation. This results in a substantial inclusion of air and formation of micro-bubbles which take a longer time and are more difficult to remove as the concentration of gelatin and therefore the viscosity of the solution are higher.

The methods which involve swelling in the cold state are not subject to the drawbacks mentioned in the preceding paragraph but are considered excessively time-consuming by an ever-increasing number of users.

For the reasons given in the foregoing, several attempts have been made to overcome these disadvantages such as spray-atomization of gelatins on a number of different supports such as sugars, maltodextrins or starches.

These formulae have produced a few advantages in some instances, in particular in regard to dissolving speed but have failed to improve the dispersibility by reason of their very small particle size which is inherent in atomized powders.

Also worthy of mention is French Pat. No. 2,167,197 which describes a process for drying gelatin without passing through the gelled state in order to make it soluble in the cold state. The compositions mentioned contain only 1 to 50% by weight of gelatin and require the addition of 2 to 5 times their weight of solid ingredients in order to obtain satisfactory wettability and dispersibility in cold liquids.

Other attempts have been made to carry out coating of gelatin grains with various dispersion products such as lecithin, silicones or wetting agents.

Apart from the fact that they are always more costly than gelatin, these products are food additives having limited use.

SUMMARY OF THE INVENTION

An original feature of the present invention lies precisely in the fact that the film-coated gelatin obtained consists of 100% by weight of gelatin.

The improved gelatin product in accordance with the invention is advantageously made up of 90 to 99.9% by weight of a basic gelatin in the form of grains or powder, said gelatin being prepared by acid, alkali or enzymic process and derived from collagenous raw materials of animal bones, hides or tendons having a Bloom strength of 0 to 350 grams and a viscosity of 1 to 100 mPa.s, and of 0.1% to 10% by weight of a gelatin hydrolyzed by acid, alkali, thermal or enzymic process or a combination of these processes, derived from collagenous substances of animal bones, hides or tendons and having a mean molecular weight of 500 to 30,000, the hydrolyzed gelatin being in the form of a film which surrounds the particles of basic gelatin.

The hydrolyzed gelatins having a molecular weight of 5,000 to 10,000 are particularly preferred whilst the basic gelatin usually has a molecular weight within the range of 100,000 to 300,000.

The basic gelatin can be a gelatin which has undergone a chemical or enzymic modification for converting its physical or chemical properties.

The invention is also directed to a method of preparation of said improved gelatin product.

This method involves film-coating of a basic gelatin with a hydrolyzed gelatin and is characterized by the following operations:
(a) Agitation of the basic gelatin to be film-coated:
either in a conventional pelletizing drum,
or in a mixer-granulator-drier or a mixer-granulator,
or a fluidized air bed apparatus such as a fluidized-air-bed spray granulator,
or in any other suitable equipment.
(b) Dissolving of the hydrolyzed gelatin at a concentration of 0.1 to 50% by weight in an aqueous liquid at a temperature within the range of 20° to 80° C.
(c) Wetting of the basic gelatin with agitation by the hydrolyzed gelatin solution by sprinkling, immersion or spraying within the apparatus chosen for producing agitation so as to ensure that the quantity of hydrolyzed gelatin added is 0.1 to 10% by weight of dry extract with respect to the mass of basic gelatin to be film-coated as expressed by weight of dry extract.
(d) Drying of the film-coated gelatin with hot air at a temperature of 30° to 80° C., either within the film-forming apparatus (in particular if this apparatus is a pelletizing drum or a fluidized air bed device) or in a suitable drying apparatus in the case of a mixer or another equipment unit which does not permit a drying operation.

In general terms, processing and drying can be performed at temperatures within the range of 20° to 80° C.

The characteristics of the basic gelatin and of the hydrolyzed gelatin employed are those indicated in the foregoing in connection with the formation of the final improved gelatin. The hydrolyzed gelatin employed for the film-forming operation is provided initially in the form of powder, of grains or of aqueous solution.

On the subject of preparation of hydrolyzed gelatin, reference can usefully be made to the following documents:
1. A COURTS, Biochem. J, 1955, 59 382 "Specificity of enzymes towards gelatin"
2. E. D. LEVIN, C. L. MURATOVA, M. STEPANOV, Khim. Pirodn. Soedn. Akad. Nauk. USSR, 1961, 208 "Hydrolysis of gelatin by gelitanase".
3. O. S. TSIPEROVICH, I. F. MISHUNIN, Ukr. Biokhim. ZH, 1970, 42 367 "Hydrolysis of gelatin by a streptomyces griseus enzyme".
4. A. GANSEL, P.S.A. Journ. Section B, p. 82 (Oct. 1952) "Study of rate hydrolysis of gelatin".
5. Patent DU PONT DE NEMOURS, 1971, FR 2 099 777, "Preparation of hydrolyzed gelatins prior to chemical modification".

Mention can also be made of U.S. Pat. No. 4,130,555 in the name of the Japanese Company known as Nippi Incorporated, and entitled "Peptide mixtures derived from collagenous material or gelatin". Examples 1, 4 and 5 of this patent describe methods for obtaining hydrolyzed gelatin from gelatin or collagenous substances of animal hides by the usual acid and thermal processes (Example 1), both of which can be combined with the enzymic process (Examples 4 and 5).

Setting of the technological parameters at the time of the film-forming operation, in particular the load of the apparatus, the temperature of the hydrolyzed gelatin solution and the flow rate of said solution, the angle of spray-atomization within the fluidized-bed units and rotary drums, the ratio of masses between hydrolyzed gelatin and basic gelatin to be film-coated, the molecular weight of the hydrolyzed gelatin, make it possible according to choice:
  either to perform individual film-coating of grains of the basic gelatin without any significant modification of the particle-size curve, of the apparent volume and of the apparent density;
  or on the contrary to facilitate agglomeration of the individually film-coated grains with each other, the result thereby achieved being:
    to eliminate the finest particles,
    to modify the particle-size distribution of the basic gelatin;
    to produce a substantial reduction in apparent density of the basic gelatin by increasing the apparent volume,
  or to obtain any intermediate result between the two preceding results.

The present invention makes it possible to add one or a number of constituents to the hydrolyzed gelatin solution in order to produce an appreciable modification of the properties of the basic gelatin, such as aromas, colorants, glucides (sugars or polysaccharides), plasticizers, surfactants, all food additives, mineral fillers, and pharmaceuticals.

The gelatin product having improved properties in accordance with the object of the present invention can have all the useful applications of gelatin and greatly facilitates such applications.

DESCRIPTION OF THE PREFERRED EMBODIMENTS

In the examples given below, all the percentages are expressed by weight.

EXAMPLE 1

300 g of pigskin gelatin obtained by acid treatment, having a particle size corresponding to a 590-micron aperture screen (U.S. Standard: 30 ASTM) and having the following characteristics:

| | | |
|---|---|---|
| Jelly strength (Bloom strength) | 200 | g (British Standard BS 757: 1975) |
| Viscosity | 3.55 | mPa.s (U.S. Standard of Gelatin Manufacturers Institute of America) |
| pH | 5.1 | |
| Humidity | 10.4% | |
| Isoelectric point | 8.9 | |
| Particle-size distribution | T.20(840) | 0.3% |
| | T.30(590) | 0.25% |
| | T.40(420) | 39.9% |
| | T.50(297) | 28.35% |
| | T.60(250) | 5.5% |
| | T.70(210) | 11.1% |
| | T.80(177) | 2.4% |
| | T.100(149) | 1.35% |
| Pass | T.100(149) | 9.85% | were introduced into the vessel of a fluidized-air-bed granulator (of a type such as the Uni Glatt granulator manufactured by the Glatt Company, Binzen, Germany) preheated to the operating temperature during a period of 10 minutes. In the table given above, the letter T designates a screen corresponding to the ASTM standard E-11-70 and the value between brackets represents the screen aperture size in microns.

The gelatin was uniformly fluidized on the fluidized-air-bed until final temperature stabilization of the mass which was undergoing fluidization. The characteristics of the fluidized air bed were as follows:
  air flow rate: maximum
  air temperature: 50° C.

The gelatin hydrolyzate solution which served as a film-forming agent was prepared by dissolving 15 g of hydrolyzate in 100 ml of distilled water. The solution was stabilized at 40° C.

The gelatin hydrolyzate was a beefskin hydrolyzate obtained by alkali treatment having a molecular weight of 7000, a viscosity of 4.5 mPa.s in a 20% solution measured at 25° C.

When the mass of gelatin in a fluidized bed was temperature-stabilized, the treatment stage was started by spraying the 15% hydrolyzate solution in the form of a mist of fine droplets.

Parameters of the treatment stage:
  Flow rate of hydrolyzate (supplied by a peristaltic pump): 10 ml/min.
  Temperature of hydrolyzate: 40° C. maintained by thermostatic control of the vessel and of the fluid circuit.
  Volume of hydrolyzate: 15 ml
  Ratio of mass of hydrolyzate to mass of gelatin in grains to be treated: 0.75%
  Pressure of spray-atomization air: 4 bar
  Treatment time: 1 minute 30 seconds.

The treatment by hydrolyzate was followed by a 5-minute drying stage, the drying temperature being maintained at 50° C.

The treated product thus obtained was compared with the check sample consisting of untreated starting gelatin.

The comparisons were established in accordance with the following tests:

| | |
|---|---|
| Bloom strength (jelly strength) | Measured in accordance with British Standard (BS) 757:1975. |
| Viscosity | Measured in accordance with U.S. Standard of Gelatin Manufacturers Institute of America. |
| Particle-size distribution | Vibrating screen test in accordance with U.S. Standard of American Society for Testing Materials (ASTM). |
| Apparent volume | Volume of 100 g of product measured in a standard glass test-tube having a capacity of 250 ml. The apparent density is obtained by dividing the weight by the volume. |
| Flowability | Time of flow of 25 g of product from a polyethylene funnel without agitation. Diameter of the flow tube: 75 mm. Angle of repose of natural slope: 30°. Diameter of flow tube: 0.8 mm. Length of tube: 60 mm. |
| Dispersion time | Time of dispersion of 10 g of product poured in a shower through the same funnel into 100 ml of water. This test is performed at 20° C. and at 70° C. |
| Dissolving time | Time necessary for dissolving 33.33 g of product poured in a single mass into 100 ml of distilled water at 90° C. with magnetic agitation but without vortex formation. |

The results of the tests are listed in the following table:

TABLE I

| | | Check sample | Treated product |
|---|---|---|---|
| Bloom strength (jelly strength) | | 204 g | 206 g |
| Viscosity | | 3.55 mPa.s | 3.52 mPa.s |
| Apparent density | | 0.65 g/ml | 0.64 g/ml |
| Apparent volume | | 1.52 ml/g | 1.56 ml/g |
| Flow time | | 2 s 24/100 | 2 s 43/100 |
| Dispersion time | | | |
| at 20° C. | | 37 s 24/100 | 3 s 26/100 |
| at 70° C. | | 11 s 41/100 | 2 s 43/100 |
| Dissolving time | | 2 mins 41 s | 1 min 24 s |
| Screen analysis (particle size distribution) | T.20 | 0.3% | 0.2% |
| | T.30 | 0.25% | 0.2% |
| | T.40 | 39.9% | 34.1% |
| | T.50 | 28.35% | 30.45% |
| | T.60 | 5.5% | 11.2% |
| | T.70 | 11.1% | 10.6% |
| | T.80 | 2.4% | 5.95% |
| | T.100 | 1.35% | 3.0% |
| Pass | T.100 | 9.85% | 4.1% |
| Humidity | | 10.4% | 9.1% |

The above table shows the spectacular improvement of the properties of wettability, dispersibility and dissolving speed, the other properties being unaffected by the surface treatment performed. The reduction of the dispersion time conclusively demonstrates the improvement in wettability, the property of dispersibility being a direct function of wettability.

EXAMPLE 2

400 g of lime-treated ossein gelatin having an isoelectric point of 4.9, a Bloom strength of 106 g, a particle size of 30-mesh, were treated in accordance with the same method as in Example 1 with a gelatin hydrolyzate having the same characteristics in a fluidized-bed granulator of the Uni Glatt type.
Treatment parameters:
  Flow rate of fluidization air: maximum
  Temperature of the air: 54° C.
  Volume of hydrolyzate solution: 100 ml
  Concentration of hydrolyzate solution: 5%
  Flow rate of hydrolyzate: 5 ml/min.
  Temperature of hydrolyzate solution: 20° C.
  Pressure of spray-atomization air: 2 bar
  Ratio of mass of hydrolyzate to mass of gelatin to be treated: 1.25%
  Treatment time: 20 mins.
  Drying temperature: 54° C.
  Drying time: 10 mins.

The product obtained under these conditions was compared with the check sample consisting of untreated gelatin (Table II).

TABLE II

| | | Check sample | Treated product |
|---|---|---|---|
| Bloom strength (jelly strength) | | 106 g | 105 g |
| Viscosity | | 2.90 mPa.s | 2.91 mPa.s |
| Apparent density | | 0.68 g/ml | 0.68 g/ml |
| Apparent volume | | 1.46 ml/g | 1.46 ml/g |
| Flow time | | 10 s 7/100 | 2 s 76/100 |
| Dispersion time | | | |
| at 20° C. | | 51 s | 6 s 3/100 |
| at 70° C. | | 64 s | 4 s 98/100 |
| Dispersion time | | 3 mins 42 s | 2 mins 03 s |
| Screen analysis (particle-size distribution) | T.20 | 0.05% | 0.05% |
| | T.30 | 0.05% | 0.2% |
| | T.40 | 54% | 51.2% |
| | T.50 | 26.8% | 31.8% |
| | T.60 | 3.7% | 3.9% |
| | T.70 | 7.2% | 6.6% |
| | T.80 | 2.0% | 2.2% |
| | T.100 | 2.7% | 1.3% |
| Pass | T.100 | 4.8% | 2.3% |
| Humidity | | 12.3% | 8.9% |

The above table shows the marked improvement in properties of wettability, dispersibility and the increase in dissolving speed.

EXAMPLE 3

300 g of pigskin gelatin obtained by acid treatment having an isoelectric point of 8.8, a Bloom strength of 205 g, a particle size of 60-mesh, were treated with a hydrolyzate which was identical with that of Examples 1 and 2.

The treatment was carried out in a fluidized-bed granulator in accordance with the method described in Example 1. The treatment parameters were set so as to obtain grains separately film-coated with hydrolyzate.
Treatment parameters:
  Flow rate of fluidization air: maximum
  Temperature of the air: 54° C.
  Volume of hydrolyzate solution: 75 ml
  Concentration of hydrolyzate solution: 5%
  Flow rate of spray-atomization air: 5 ml/min.
  Time-duration of spray atomization: 15 mins.
  Temperature of hydrolyzate solution: 20° C.
  Spray atomization pressure: 2 bar
  Ratio of hydrolyzate to mass of gelatin to be treated: 1.25%
  Temperature of drying air: 54° C.
  Drying Time: 10 mins.

The product obtained was compared with the check sample consisting of untreated starting gelatin (Table III).

TABLE III

|  |  | Check sample | Treated product |
|---|---|---|---|
| Bloom strength |  | 205 g | 203 g |
| Viscosity |  | 3.76 mPa.s | 3.76 mPa.s |
| Apparent density |  | 0.67 g/ml | 0.67 g/ml |
| Apparent volume |  | 1.5 ml/g | 1.5 ml/g |
| Flow time |  | 2 s 29/100 | 2 s 31/100 |
| Dispersion time |  |  |  |
| at 20° C. |  | in excess of 30 mins., crust at surface | ≦30 mins. |
| at 70° C. |  | in excess of 16 hrs, crust at surface | ≦30 mins. |
| Dissolving time |  | 8 mins. | 4 mins 46 s |
| Screen analysis | T.20 | 0.0% | 0.1% |
| (particle-size | T.30 | 0.05% | 0.1% |
| distribution) | T.40 | 0.4% | 0.6% |
|  | T.50 | 1.2% | 3.1% |
|  | T.60 | 1.3% | 3.7% |
|  | T.70 | 9.9% | 20.0% |
|  | T.80 | 26.6% | 20.6% |
|  | T.100 | 16.9% | 20.2% |
| Pass | T.100 | 43% | 30.6% |
| Humidity |  | 10.06% | 8.4% |

The foregoing results show a spectacular improvement in the properties of wettability and dispersibility accompanied by disappearance of the usual phenomena of caking and crust formation with the particle-size distribution given above.

EXAMPLE 4

500 g of pigskin gelatin obtained by acid treatment which was identical with that described in Example 1 were treated with a gelatin hydrolyzate obtained by alkali treatment of beefskin (molecular weight: 8000, viscosity at 20% and 25° C.: 5.0 mPa.s).

The treatment parameters were set so as to obtain at the same time industrial film-coating of the grains and granulation by agglomeration.

The operation was performed in a fluidized-air-bed granulator by means of the same method as the method given in Examples 1 and 2.

Treatment parameters
 Flow rate of fluidization air: maximum
 Temperature of the air: 60° C.
 Volume of hydrolyzate solution: 125 ml
 Concentration of hydrolyzate solution: 5%
 Flow rate of spray-atomization air: 10 ml/min.
 Time-duration of spray atomization: 12 mins 30 s
 Temperature of hydrolyzate solution: 20° C.
 Spray atomization pressure: 2 bar
 Ratio of hydrolyzate to mass of gelatin to be granulated: 1.75%
 Temperature of drying air: 60° C.
 Drying time: 5 mins.

During the operation, a marked increase both in particle size and in apparent volume were observed.

The product obtained under these conditions was compared with the check sample consisting of untreated starting gelatin (Table IV).

TABLE IV

|  |  | Check sample | Treated product |
|---|---|---|---|
| Bloom strength (jelly strength) |  | 204 g | 205 g |
| Viscosity |  | 3.55 mPa.s | 3.55 mPa.s |
| Apparent density |  | 0.65 g/ml | 0.41 g/ml |
| Apparent volume |  | 1.52 ml/g | 2.42 ml/g |
| Flow time |  | 2 s 24/100 | 4 s 75/100 |
| Dispersion time |  |  |  |
| at 20° C. |  | 37 s 24/100 | 7 s 49/100 |
| at 70° C. |  | 11 s 41/100 | 4 s 44/100 |
| Dissolving time |  | 2 mins 41 s | 1 min 48 s |
| Screen analysis | T.20 | 0.3% | 1.8% |
| (particle-size | T.30 | 0.25% | 13.75% |
| distribution) | T.40 | 39.9% | 49.05% |
|  | T.50 | 28.35% | 23.95% |
|  | T.60 | 5.5% | 5.2% |
|  | T.70 | 11.1% | 2.8% |
|  | T.80 | 2.4% | 1.5% |
|  | T.100 | 1.35% | 0.8% |
| Pass | T.100 | 9.85% | 1% |
| Humidity |  | 10.4% | 9.4% |

As in Examples 1, 2 and 3, this table shows a distinct improvement in the properties of wettability, dispersibility and an increase in dissolving speed. It also shows elimination of fine powders and potential dust by a phenomenon of granulation accompanied by a reduction in apparent density and an increase in apparent volume.

What is claimed is:

1. A gelatin product having improved wettability and dispersibility properties, comprising particles of a basic gelatin coated with a film of a hydrolyzed gelatin.

2. A gelatin product according to claim 1, wherein the basic gelatin constitutes 90 to 99.9% by weight of the gelatin product and has a bloom strength of 0 to 350 grams and a viscosity of 1 to 100 mPa.s, and the hydrolyzed gelatin constitutes 0.1% to 10% by weight of the gelatin product and has a mean molecular weight within the range of 500 to 30,000.

3. A gelatin product according to claim 2, wherein the hydrolyzed gelatin has a mean molecular weight within the range of 5,000 to 10,000.

4. A gelatin product according to claim 1 which contains at least one additive for modifying the properties of the gelatin product.

5. A gelatin product according to claim 2, which contains at least one additive for modifying the properties of the gelatin product.

6. A gelatin product according to claim 5, wherein said at least one additive is selected from the group consisting of aromas, colorants, glucides, plasticizers, surfactants, food additives, mineral fillers, and pharmaceuticals.

7. A gelatin product according to claim 4, wherein said at least one additive is selected from the group consisting of aromas, colorants, glucides, plasticizers, surfactants, food additives, mineral fillers, and pharmaceuticals.

8. A method of preparation of a gelatin product having improved wettability and dispersibility properties and comprising particles of a basic gelatin coated with a film of a hydrolyzed gelatin, comprising the steps of agitating a quantity of the basic gelatin particles, dissolving a quantity of the hydrolyzed gelatin at a concentration of 0.1 to 5% by weight in an aqueous liquid at a temperature within the range of 10° to 80° C., agitating and wetting the basic gelatin particles with the hydrolyzed gelatin solution by sprinkling, immersion or spray-atomization to coat the particles with a film of the hydrolyzed gelatin and so as to ensure that the proportion of added hydrolyzed gelatin is within the range of 0.1 to 10% by weight of dry extract with respect to the mass of basic gelatin expressed in weight of dry extract, and drying the film-coated gelatin particles.

9. A method according to claim 8, wherein the basic gelatin has a Bloom strength within the range of 0 to 350 grams and a viscosity within the range of 1 to 100 mPa.s, and the hydrolyzed gelatin has a mean molecular weight within the range of 500 to 30,000.

10. A method according to claim 9, wherein the hydrolyzed gelatin has a mean molecular weight within the range of 5,000 to 10,000.

11. A method according to claim 8, wherein the agitating and wetting step and the drying step are performed at temperatures within the range of 20° to 80° C.

12. A method according to claim 9, wherein the agitating and wetting step and the drying step are performed at temperatures within the range of 20° to 80° C.

13. A method according to claim 8, wherein at least one substance is added to the hydrolyzed gelatin solution for modifying the properties of the gelatin product.

14. A method according to claim 10, wherein a pigskin gelatin obtained by acid treatment is utilized as the basic gelatin and a beefskin hydrolyzate obtained by alkali treatment is utilized as the hydrolyzed gelatin.

15. A method according to claim 10, wherein a lime-treated ossein gelatin is utilized as the basic gelatin and a beefskin hydrolyzate obtained by alkali treatment is utilized as the hydrolyzed gelatin.

16. A method according to claim 14, wherein the step of agitating the basic gelatin particles and the step of agitating and wetting the particles with hydrolyzed gelatin solution are performed in a fluidized-air-bed spray granulator.

17. A method according to claim 15, wherein the step of agitating the basic gelatin particles and the step of agitating and wetting the particles with hydrolyzed gelatin solution are performed in a fluidized-air-bed spray granulator.

* * * * *